United States Patent [19]

Kapura et al.

[11] Patent Number: 4,460,397
[45] Date of Patent: * Jul. 17, 1984

[54] FLOAT GLASS METHOD AND APPARATUS WITH ENHANCED LATERAL TRACTION FOR ATTENUATION

[75] Inventors: Edward M. Kapura, Carlisle, Pa.; Henry C. Goode, Owen Sound, Canada

[73] Assignee: PPG Industries, Inc., Pittsburgh, Pa.

[*] Notice: The portion of the term of this patent subsequent to Aug. 3, 1999 has been disclaimed.

[21] Appl. No.: 423,968

[22] Filed: Sep. 27, 1982

[51] Int. Cl.³ .............................................. C03B 18/04
[52] U.S. Cl. .................................... 65/99.5; 65/182.4; 65/182.5
[58] Field of Search ..................... 65/99.5, 182.4, 182.5

[56] References Cited

U.S. PATENT DOCUMENTS

| | | | |
|---|---|---|---|
| 3,450,518 | 6/1969 | Itakura et al. | 65/182 |
| 3,520,672 | 7/1970 | Greenler et al. | 65/91 |
| 3,661,548 | 5/1972 | Ito et al. | 65/91 X |
| 3,684,471 | 8/1972 | Matsushita | 65/91 |
| 3,695,859 | 10/1972 | Dickinson et al. | 65/91 X |
| 3,709,673 | 1/1973 | Bishop | 65/182 |
| 3,713,797 | 1/1973 | Lawrenson | 65/91 |
| 3,929,444 | 12/1975 | May et al. | 65/182 X |
| 3,998,616 | 12/1976 | Farabaugh | 65/29 |
| 4,074,994 | 2/1978 | Glikman et al. | 65/44 |
| 4,157,908 | 6/1979 | Gagne | 65/99.5 |
| 4,342,583 | 8/1982 | Kapura et al. | 65/99.5 |

OTHER PUBLICATIONS

"A One-Dimensional Model of Stretching Float Glass", by O. S. Narayanaswamy, The Journal of the American Ceramic Society, vol. 60, No. 1-2, Jan.-Feb. 1977.

Primary Examiner—Arthur D. Kellogg
Attorney, Agent, or Firm—Dennis G. Millman

[57] ABSTRACT

A cylindrical ribbon engaging device is rotated about an axis of rotation substantially parallel to the direction of ribbon flow to positively exert lateral forces to an elongated substantial continuum of the marginal edge portion of the ribbon. Provisions are made to maximize lateral forces while minimizing longitudinal forces.

25 Claims, 7 Drawing Figures

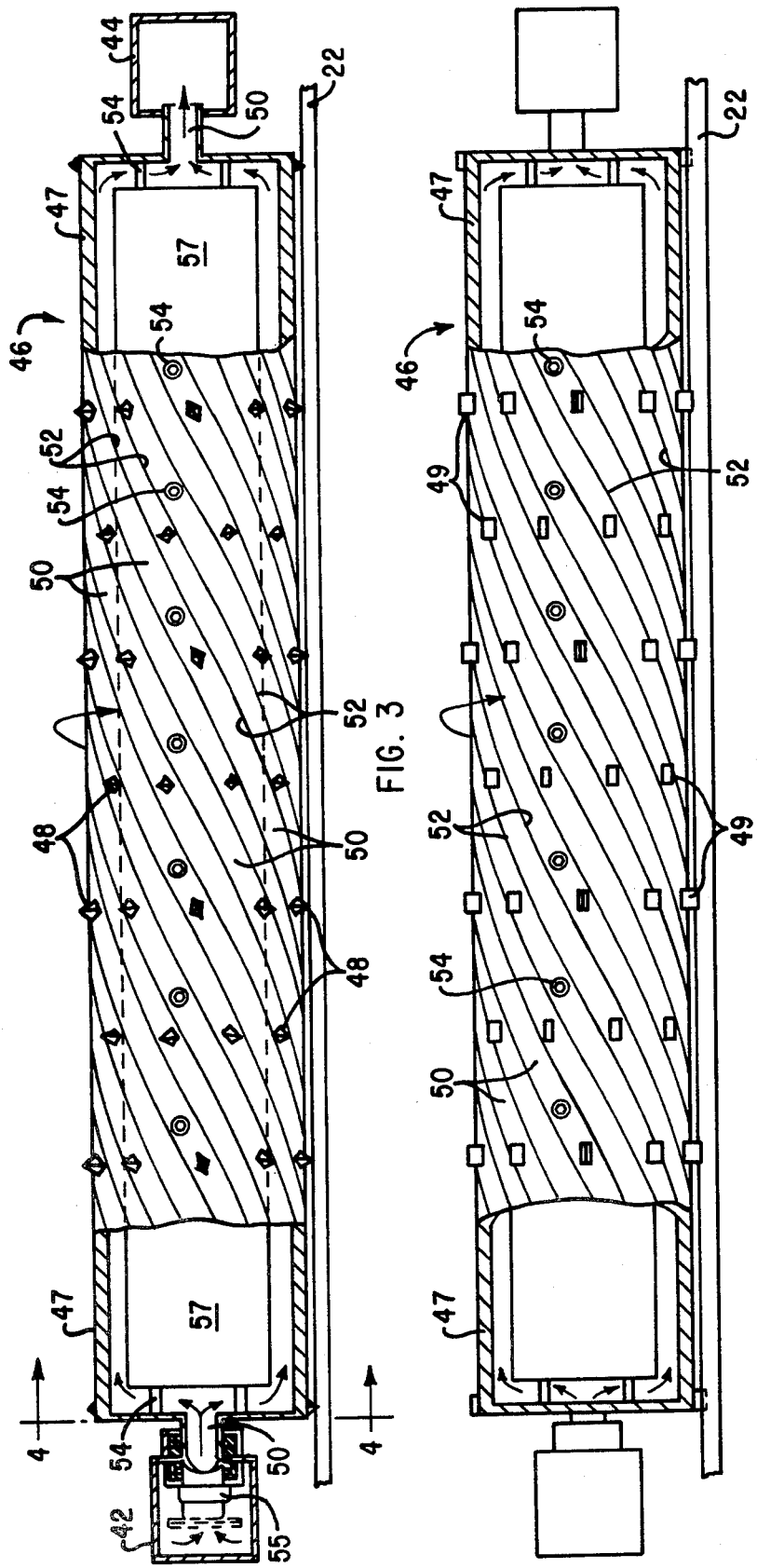
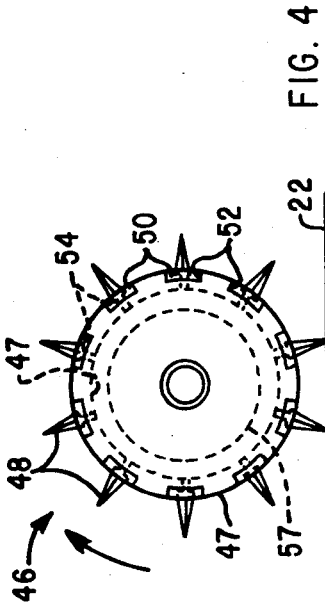

FLOAT GLASS METHOD AND APPARATUS WITH ENHANCED LATERAL TRACTION FOR ATTENUATION

BACKGROUND OF THE INVENTION

The present invention relates to an apparatus for and method of engaging the marginal edge portions of a ribbon of float glass, and further, to a drum-shaped edge roll for exerting forces on marginal edge portions of the ribbon.

In a float forming process, molten glass is delivered onto a pool of molten metal and therafter formed into a continuous ribbon. Under the competing forces of gravity and surface tension, the molten glass spreads to an equilibrium thickness of about 0.27 inches (0.69 cm.). In order to produce glass ribbon of less than equilibrium thickness the ribbon is normally subjected to both longitudinal and lateral tractive forces while in a viscous state.

Longitudinal tractive forces are generally exerted upon the ribbon by conveying means downstream from the float chamber. Such longitudinal forces may adversely affect the ribbon in at least two ways; by prompting a narrowing tendency, and by inducing optically undesirable surface variations in the ribbon. Such surface variations may take the form of longitudinally oriented distortions, e.g., corrugations.

It is known in the glass manufacturing art to exert outwardly directly lateral tractive forces to the marginal edge portions of the viscous ribbon to control the narrowing tendency of the ribbon and produce lateral ribbon attenuation. Examples of such techniques may be found in the teachings of U.S. Pat. Nos. 3,450,518 to Itakura et al.; 3,520,672 to Greenler; 3,695,859 to Dickinson; 3,709,673 to Bishop; 3,929,444 to May et al.; 3,998,616 to Farabaugh and 4,157,908 to Gagne. Teachings of each of the above-mentioned patents are useful in the temperature and viscosity region where the ribbon is readily attenuatable, i.e., where ribbon temperature is between about 1800° F. (980° C.) and about 1500° F. (815° C.). It has been learned, however, that undesirable longitudinally oriented ribbon distortions may originate in a lower temperature region downstream of the typical attenuation region, e.g. between about 1500° F. (815° C.) and about 1250° F. (680° C.) The prior art has not recognized the existence of such a problem nor taught a method of diminishing the adverse effects of such distortions. Further, conventional prior art attenuating devices are not ideally suited for operation in the lower temperature range where such distortions may originate.

U.S. Pat. Nos. 3,709,673 to Bishop; 3,929,444 to May et al.; and 3,998,616 to Farabaugh are exemplary of edge roll machines known in the glass manufacturing art which engage the marginal edge portion of the ribbon with a rotating disc-shaped edge roll having circumferentially positioned teeth. The edge roll is generally mounted on one end of a barrel which extends through the chamber side wall, and is driven from outside the chamber about an axis of rotation parallel to the barrel. The barrel is inserted into the chamber at an angle generally slightly downstream of a line normal to the ribbon's center line to provide the desired lateral component of force. Although these devices are useful in attenuating the ribbon in the traditional attenuation region, the devices are normally spaced about 10 feet (3 meters) apart on each side of the ribbon and each exerts a force upon the ribbon along only a very small portion of the marginal edge, effectively a point of applied force. As a result, they are relatively ineffective in supplying the increased lateral attenuation forces required in the lower temperature region where ribbon viscosity has increased. Further, the teeth of the subject devices have diminished ability to grip the lower temperature, higher viscosity ribbon, thus resulting in skidding rather than effective gripping, and further limiting effectiveness.

U.S. Pat. No. 3,520,672 to Greenler teaches an edge roll machine having a plurality of closely spaced disc-shaped edge rolls, each mounted on individual barrels and commonly driven from without the chamber to rotate about an axis of rotation slightly downstream of a line normal to the ribbon's center line. Although this device provides more closely spaced forces to the marginal edge of the ribbon, there still remains at least the diameter of a single edge roll between adjacent points of force, and furthermore, the plurality of individual barrels may act as a considerable heat sink along the ribbon edge to create an undesirable temperature gradient thereacross.

U.S. Pat. No. 3,450,518 to Itakura et al. teaches an edge grasping device including an elongated rod having a ribbon engaging hook secured to one end. The rod is extended through the chamber sidewall and reciprocated in a generally elliptical manner to cause the hook to intermittently grasp the ribbon edge and pull it laterally outward. Such a device exerts a force on a very small region of the ribbon and suffers from the previously discussed limitations related thereto. Further, the hook only engages the ribbon during about one half of its reciprocating path, leaving the ribbon disengaged during the remaining portion.

U.S. Pat. No. 4,157,908 to Gagne teaches an edge engaging device having a toothed cylindrical member supported at one end thereof by a single elongated arm. The cylindrical member engages the ribbon and is rotated about an axis which extends generally in the direction of glass flow. This patent teaches that the cylindrical member be positioned such that its downstream end is imbedded into the surface of the glass while its upstream end remains above and disengaged from the surface of the glass to avoid a backup of the glass. Although useful in controlling ribbon thickness in the temperature region where the ribbon is readily attenuatable, the device is limited in its usefulness in the subject lower temperature region. The angled engagement between the cylindrical member and the ribbon surface limits the effective length of the cylindrical member, but more importantly, may be largely unattainable in the lower temperature ranges because of the relatively higher viscosity of the ribbon and corresponding increased resistance to indentations by objects having large surface areas. In the Gagne patent, glass engaging projections are moved in a lateral direction, but the major glass-impelling surfaces on the projections face the longitudinal direction, so that the major thrust of the worm gear action would be longitudinal. This is reinforced by the preference for making the projections elongated in the circumferential direction. Thus, the Gagne arrangement is not adapted for maximizing lateral forces.

An article in the Journal of the American Ceramics Society, Vol. 6, No. 1-2, January-February 1977, pp. 1-5, by O. S. Narayanaswamy teaches a method of attenuating a float glass ribbon which includes advancing molten glass to a bath entry region where it freely flows to equilibrium thickness, then advancing it downstream to a cooled, high viscosity (1300° F. (700° C.), $10^8$ poises) region of equilibrium thickness, followed by advancement through a region where the glass is reheated and attenuated to less than equilibrium thickness. The intermediate high viscosity region includes a pair of opposed conventional edge rolls which grip the ribbon to counteract the downstream longitudinal tractive force and prevent its transmission into the bath entry region. The article does not address the problem of diminishing longitudinal distortion in the ribbon after attenuation occurs. It would be advantageous to have a method of attenuating float glass which would diminish longitudinal distortion in the final product. It would also be advantageous to have a device capable of effecting such a result which is operable in a relatively low temperature, high viscosity region of the float chamber.

U.S. Pat. No. 4,342,583 to Kapura and Goode is directed to related subject matter.

SUMMARY OF THE INVENTION

The invention relates to means for and a method of attenuating a ribbon of glass by providing a cylindrical member having ribbon engaging elements, e.g., teeth or ridges, about its circumferential surface, supporting the cylindrical member with its lower circumferential surface adjacent and substantially parallel to the ribbon surface, and rotating the cylindrical member about an axis of rotation which is generally parallel to the direction of ribbon flow. Such rotation enables the ribbon engaging element to engage the ribbon to positively exert laterally outward tractive forces thereto. Rotation of the cylindrical attenuating device permits application of enhanced lateral forces to the glass ribbon. Orientation of the cylinder with its axis substantially parallel to the direction of glass travel results in an attenuating force having a major component in the lateral direction and little or no component in the longitudinal direction. By "substantially parallel" is meant that the axis of the cylinder may be at an angle less than 45° with respect to the longitudinal direction of glass travel. A slight angle is usually preferred so that each glass-engaging projection may be moved in the glass with a longitudinal component of velocity that approximates the longitudinal velocity of the glass ribbon, thereby imparting little or no longitudinal force to the ribbon.

Another way of describing the action of preferred attenuating means of the present invention on the glass is in terms of the "plowing" effect created by the glass-engaging projections carried by the rotating cylinder. Each projection may have a major glass-impelling surface extending substantially radially and substantially parallel to the axis of the cylinder (i.e., within 45°), whereby the glass-impelling surfaces meet the glass substantially normal to the direction of movement of the projections as the cylinder is rotated about its axis. The projecting members may be discrete teeth or elongated ridges, including ridges that extend helically around the cylinder.

Another aspect of the invention relates to traction between a cylindrical attenuator and the glass. Improved traction may be attained by providing teeth on the cylinder in a relatively widely spaced pattern so that a plurality of teeth contact the glass simultaneously, but no two teeth engage the glass within four centimeters of each other along the axial direction. For the same reason, it is preferred that teeth be spaced circumferentially so that in any given segment of the cylinder (e.g., about four centimeters in the axial direction) no more than one tooth engages the glass at one time, and preferably as one tooth disengages the glass as the next tooth simultaneously comes into contact with the glass. Furthermore, increasing the total number of teeth in contact with the glass at any given time, when spaced as set forth above, will increase the total amount of tractive force attainable by the cylinder. Accordingly, it is desirable to provide the cylinder with sufficient length to accommodate a plurality of spaced apart, simultaneously contacting projections. Providing at least three simultaneous contact points is preferred, and providing at least five is most preferred.

The present invention has particular applicability to attenuating a ribbon glass to diminish undesirable longitudinally oriented surface distortions which are produced in the ribbon both in the traditional attenuation region and downstream therefrom, by the positive application of outwardly directed lateral forces in the region where the ribbon has a temperature less than about 1500° F. (815° C.), which is cooler and farther downstream than conventional attenuation.

BRIEF DESCRIPTION OF THE DRAWINGS

FIG. 3 is a view, having portions removed for clarity, taken along line 3—3 of FIG. 1, showing an edge engaging device incorporating features of the present invention.

FIG. 4 is an end elevational view taken along line 4—4 of FIG. 3 showing the orientation of teeth about the outer circumferential surface of the edge engaging device.

FIG. 5 is a view smilar to the view of FIG. 3 showing a second embodiment of the present invention.

DETAILED DESCRIPTION OF THE INVENTION

Figure 1:
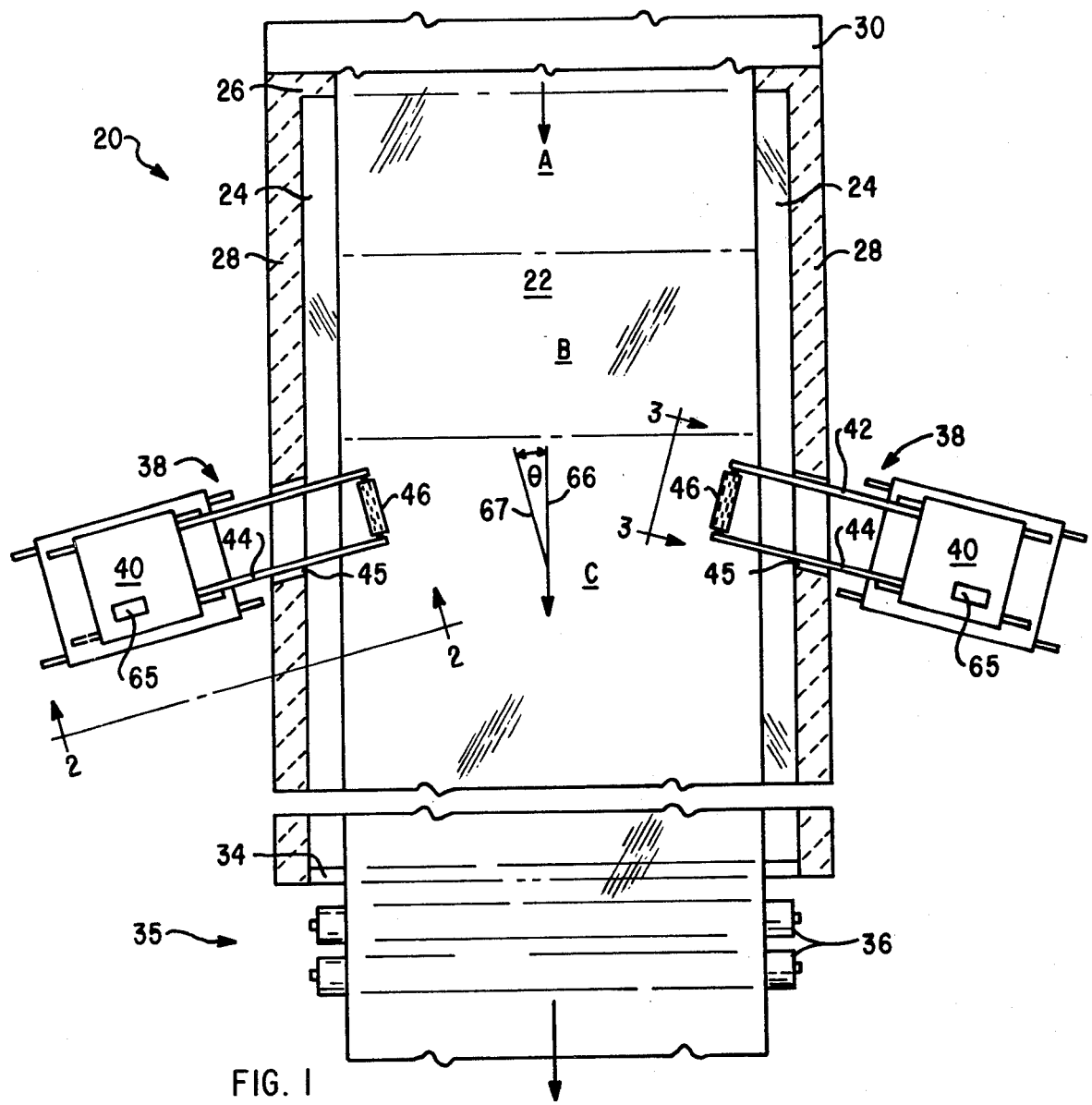
FIG. 1 is a fragmented schematic plan view of a float chamber having portions of the roof removed to show edge engaging devices operating according to a preferred embodiment of the present invention.

Referring to FIG. 1, there is shown a float glass forming chamber 20 of the type known in the glass manufacturing art. The chamber 20 generally consists of a refractory backwall 26, refractory sidewalls 28, a refractory roof 30, a refractory bottom 32 (shown only in FIG. 2), and a refractory end dam 34 adjacent a discharge end 35. In general, a ribbon 22 of glass is formed in chamber 20 from a mass of molten glass which is delivered upon a pool 24 of molten metal, e.g., tin or an alloy thereof. The ribbon is advanced downstream upon the pool 24 in the direction of the arrow by a plurality of lift out rolls 36 located near the discharge end 35 of the chamber 20. As the ribbon advances downstream it generally cools from an initial temperature of about 2000° F. (1100° C.) to about 1100° F. (595° C.) at the discharge end 35.

Although not limiting to the invention, it is generally desirable to deliver a mass of molten metal onto the pool 24 in any convenient manner at a relatively high initial temperature, i.e., 2000° F. (1100° C.), and maintain the glass in a relatively high temperature range, e.g., from about 2000° F. (1100° C.) to about 1700° F. (925° C.), for a relatively long residence time. Such a region is designated region A in FIG. 1 and represents a relaxation zone where the relatively low viscosity of the glass encourages equilibration of flow perturbations arising from the delivery onto the pool 24. Accordingly, in region A the glass is generally either greater than or equal to equilibrium thickness.

Region B of FIG. 1 represents an attenuation region of the chamber 20 in which the ribbon 22 is stretched to a thickness less than equilibrium thickness in any convenient manner. Although not limiting to the invention, the glass may enter region B at a temperature of about 1800° F. (980° C.) and is typically cooled while passing therethrough to a temperature of about 1500° F. (815° C.) at the downstream end. The glass is drawn from region A into region B and therethrough by longitudinal forces which are exerted upon the glass by the lift out rolls 36 adjacent the discharge end 35 of the chamber 20. Such longitudinal forces produce a desirable reduction in thickness in the ribbon in region B, but also tend to produce an undesirable reduction in ribbon width due to surface tension forces in the ribbon. For this reason it is common in the glass manufacturing art to also exert lateral stretching forces on the ribbon in region B. Top edge rolls as taught in U.S. Pat. No. 3,929,444, gas jets as taught in U.S. Pat. No. 3,440,030, which teachings are incorporated herein by reference, and other means may be utilized in region B to exert such lateral stretching forces. The lateral stretching forces may be controlled in region B so as to increase ribbon width, maintain a constant ribbon width, or produce a controlled reduction in ribbon width, as taught in U.S. Pat. Nos. 3,440,030, 3,843,346, and 3,695,859, which teachings are also incorporated herein by reference.

Region C of FIG. 1 represents a region of the chamber 20 wherein the ribbon has a temperature between about 1500° F. (815° C.) and the discharge temperature of about 1100° F. (595° C.). Because of the ribbon's relatively high viscosity in this region it has heretofore generally been considered impractical and ineffective to exert lateral stretching forces upon the ribbon in region C. Accordingly, it has been customary to effect a major portion of the ribbon attenuation in region B by the application of both lateral and longitudinal stretching forces, after which the ribbon 22 was advanced thorugh region C and cooled without the application of lateral stretching forces. Some portion of the total attenuation may occur in region C, but it has heretofore been accompanied by a corresponding decrease in ribbon width due to ribbon surface tension forces. To minimize this corresponding decrease of ribbon width, it is common to rapidly cool the ribbon upon entry into region C.

It has been determined, however, that undesirable longitudinally oriented surface distortion patterns may originate in the ribbon 22 in region C. It is believed that such distortion patterns may be a result of the longitudinal tractive forces exerted upon the ribbon 22 by downstream conveying rolls and the above-mentioned decrease in ribbon width produced thereby. Additional distortion is believed to be caused by the rapid cooling needed in region C to avoid undue ribbon width decrease.

Such surface distortion patterns may take the form of corrugations in the ribbon, which will diminish the optical quality of the final ribbon according to the relationship:

$$P = khf^2$$

where P is the optical power of the distortion, k is a constant, h is the amplitude of the surface defect, and f is the spatial frequency of the distortion pattern.

In a preferred application of the present invention, outwardly directed lateral forces are positively exerted to the ribbon in region C to diminish or eliminate the effect of such longitudinally oriented distortion patterns. More particularly, the lateral forces are applied to reduce the amplitude, h, and spatial frequency, f, of the pattern, with a particular interest in reducing the spatial frequency f because of its second power relationship with the optical power, P. Moreover, application of such lateral forces in region C permits the cooling of the ribbon to be effected in a more gradual and natural manner, thus avoiding distortion problems which were previously encountered due to rapid cooling. Because of the relatively high viscosity of the ribbon 22 in region C, it is desirable to exert relatively large lateral stretching forces on the ribbon to produce the desired result. Of course, the edge engaging devices of the present invention may also be utilized in region B for traditional attenuation activities.

Referring to FIG. 1, edge engaging devices 38, incorporating features of the present invention, are utilized in region C to positively exert relatively large lateral stretching forces in order to control ribbon width therein and diminish distortion effects. More particularly, edge engaging devices 38 may be utilized to increase ribbon width, maintain ribbon width at a constant value, or establish a controlled decrease in ribbon width. Each of the devices 38 includes a support facility 40 positioned outside the sidewall 28, a pair of spaced, elongated arms 42 and 44 which extend through a sealable opening 45 in sidewall 28, and a glass engaging member 46. The glass engaging member 46 is preferably generally cylindrical or drum shaped and is rotatably mounted along its longitudinal axis between the extended ends of arms 42 and 44 in a manner to be discussed below. As shown in FIG. 1, the member 46 is positioned such that its cylindrical axis is generally parallel to the direction of glass travel or the longitudinal centerline of the ribbon 22, as shown in FIG. 3, with its lower circumferential surface generally parallel to the surface of the ribbon 22.

Referring to FIGS. 3 and 4, the glass engaging member 46 includes an outer cylindrical member 47 having a plurality of discrete teeth 48 secured to the outer circumferential surface thereof. In a preferred mode of construction, the teeth 48 are mounted in spaced relation along a strap 50 which has beveled edges, which edges are captured in a complementarily beveled groove 52 in the surface of the member 47, and retained therein by set screws 54. In this manner, discrete teeth 48, or rows thereof, may be conveniently replaced without requiring replacement or re-machining of the glass engaging member 46. Replacability of teeth permits optimizing the effectiveness of the glass engaging member 46 when it is utilized in different regions of the chamber 20, as different teeth configurations may be more efficient in different regions.

The teeth 48 which are used in region C may be relatively long and sharp, and may take the form of cones or pyramids as shown in FIGS. 3 and 4. Alternatively, and with reference to FIG. 5, teeth 49 may have a rectangular base having a lengthwise dimension parallel to the axis of the cylindrical member 47. Preferably, such teeth have a relatively sharp apex also lying substantially parallel to the axis of the cylindrical member 47. Because ribbon movement is generally parallel to the axis of the cylindrical member 47, such an arrangement of the teeth 49 minimizes impedance to the ribbon flow while also presenting a relatively large surface area for gripping the ribbon in the lateral direction.

The elongated cylindrical shape of the glass engaging members 46 enables greater traction to be attained relative to conventional attenuating wheels or multiples thereof in that a large number of glass contact points can be provided on a single device. Thus, cylindrical member 46 preferably carries a pattern of projections 48 or 49 such that at least three of the projections contact the glass at any given time. In the most preferred cases, at least five simultaneous contact points are provided. The projections may be arranged in rows as shown in FIGS. 3 and 5, or they may be arranged in a less regular array on the cylinder. Increasing the number of contact points within a relatively small area is an advantage of the present invention, but reducing the spacing between contact points unduly can have a negative effect on traction. The minimum spacing will depend upon the viscosity of the glass in the particular region being contacted as well as other factors, but for operating in region C it is preferred that the projections be spaced so that projections contacting the glass at any given time are at least four centimeters apart in the direction of the axis of the cylinder. Circumferentially, the spacing may be closer, provided that a first projection disengages from the glass before a subsequent projection engages the glass within four centimeters axially of the first projection.

Figure 6:
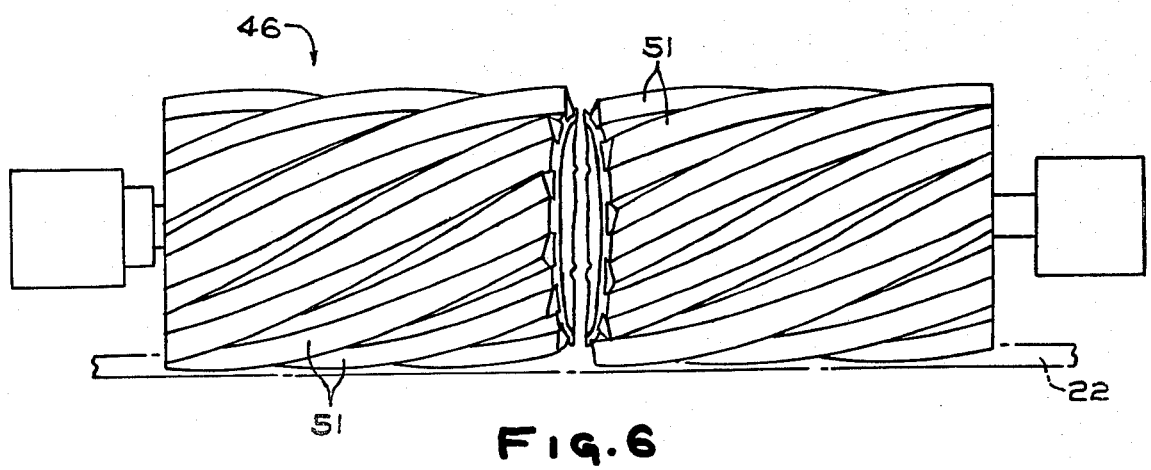
FIG. 6 is a view similar to the view of FIG. 3 showing a third embodiment of the present invention.

Referring to FIG. 6, a strap 51 having a continuous ridge formed on its outer surface may be optionally utilized on cylindrical member 47 instead of discrete teeth 48 or 49. Preferably the glass engaging ridge of strap 51 has a relatively sharp apex angle to promote efficient ribbon gripping when such an arrangement is used in region C of the chamber 20. The ridges may be parallel to the axis of the cylinder, or they may be slightly helical as shown in FIG. 6. The pitch of the helix is such that the ridges make an angle less than 45° with the axis of the cylinder.

Figure 2:
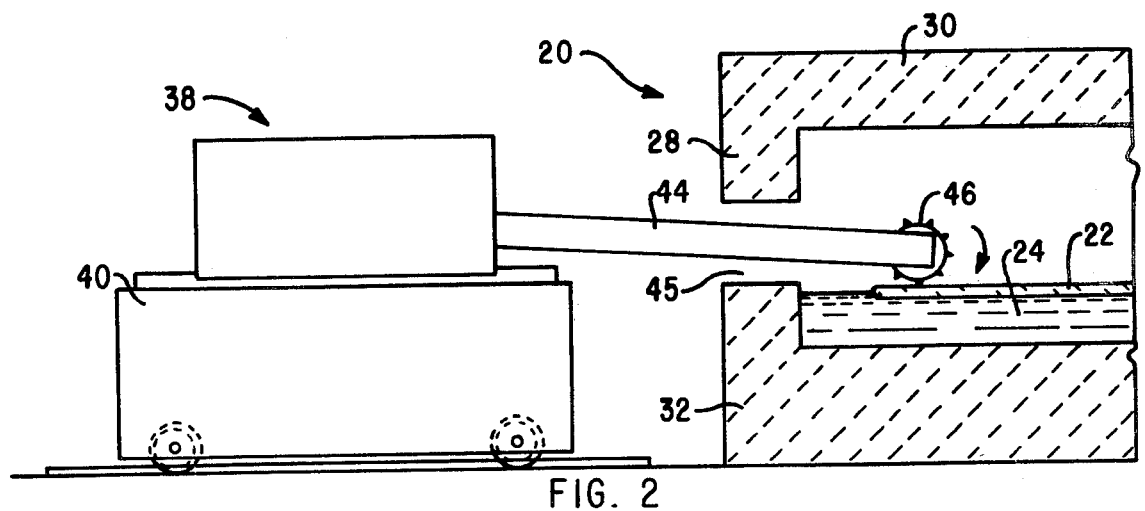
FIG. 2 is an elevated side view of an edge engaging device incorporating features of the present invention taken along line 2—2 of FIG. 1.
Figure 7:
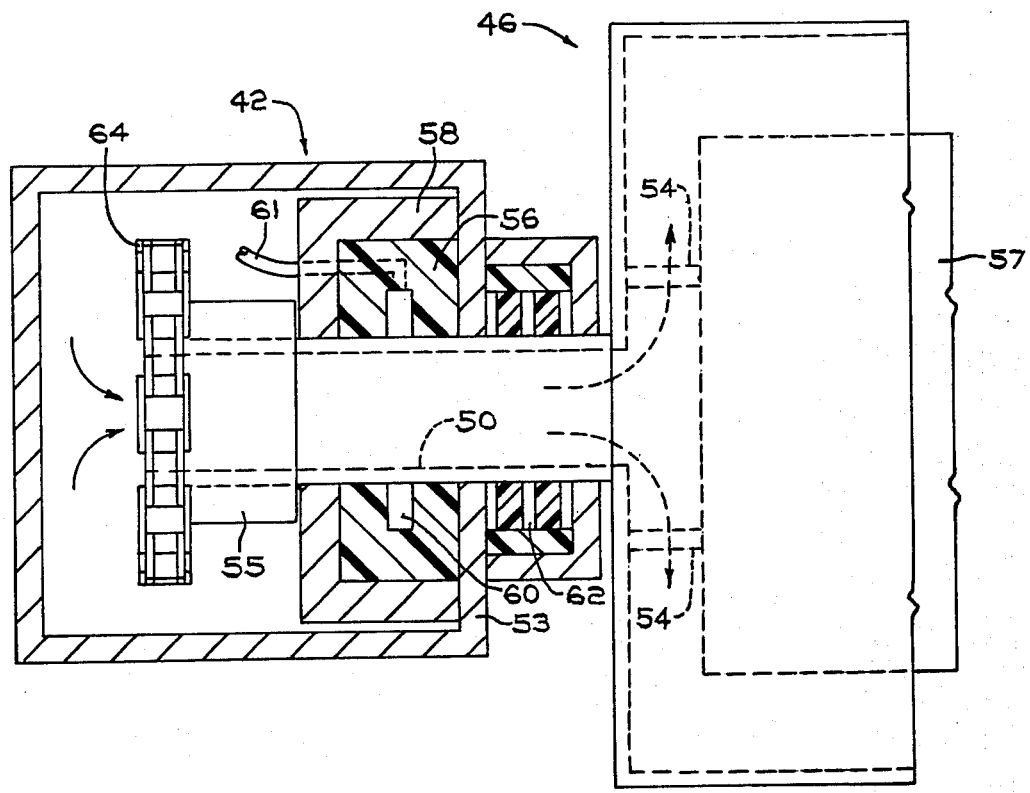
FIG. 7 is an enlarged cross-sectional view of the left hand portion of FIG. 3.

Referring to FIGS. 1 and 2, the support facility 40 of edge engaging device 38 may provide for vertical adjustment of the engaging member 46, upstream or downstream adjustment of engaging member 46, and inward and outward adjustment of the position of engaging member 46 with respect to the ribbon 22. Facilities known in the glass manufacturing art, such as floor mounted carriages as shown in FIG. 2 and as taught in U.S. Pat. No. 3,709,673, which teachings are herein incorporated by reference, may be modified conveniently to support the pair of elongated arms 42 and 44. Alternatively, an overhead-mounted support facility such as taught in U.S. Pat. No. 3,929,444, which teachings are incorporated by reference, may be conveniently utilized.

When stretching the ribbon laterally outward, the edge engaging devices are preferably angled as shown in FIG. 1 so that the engaging members 46 are oriented with their downstream ends closer to the center of the ribbon. The direction of glass travel, designated by line 66, and the direction of the axis of an engaging member (in this case the member on the left of FIG. 1), designated by lfne 67, form angle $\theta$, which is between 0° and 45°. With the rotating member thus angled, the projections on the cylinder move in contact with the glass with a lateral and a longitudinal component of velocity. The longitudinal component is minor, but by coordinating the speed of rotation of the cylinder with the ribbon speed, the longitudinal component may closely approximate the ribbon speed so that little or no force is applied to the ribbon in the longitudinal direction. As a result, attenuation in accordance with the present invention need not involve longitudinal stretching. Likewise, resistance to downstream movement of the ribbon is avoided. At the same time, because the major velocity component of the projections is in the lateral direction, substantial lateral tractive force may be developed. This enhanced lateral force permits lateral attenuation in regions where conventional attenuating means have been considered impractical because of low traction.

Referring now to FIGS. 3 and 6, an end of the engaging member 46 is rotatably mounted to an end of adjacent elongated arm 42 or 44 by a hollow shaft member 50, which is sealingly secured to the end of the engaging member 46 at one end and extends into the interior of elongated arm 42 or 44 through an opening in the inside vertical wall portion 53 thereof. The hollow shaft member 50 is rotatably mounted within the elongated arm 42 or 44 by bearings 55.

Because of the high temperatures encountered within the forming chamber 20, it is desirable to cool the engaging member 46. Accordingly, cooling fluid is passed through elongated arm 42 and hollow shaft 50 to the engaging member 46 and therethrough to elongated arm 44, as illustrated by fluid flow arrows of FIGS. 3 and 6. A solid inner cylindrical member 57 is conveniently mounted inside the engaging member 46 by baffle plates 54, to divert and localize the flow of cooling fluid to the areas adjacent the surface portions of the other cylindrical member 47 (as shown by fluid flow arrows). In this manner the weight of the engaging member 46 is minimized and cooling capacity is utilized more effectively.

Referring to FIG. 6, it is important to assure that cooling fluid remains within a closed system and does not escape into the atmosphere of the forming chamber 20. Likewise, it is important to protect the interior components of the edge engaging device 38 from attack by the hostile gaseous atmosphere of the forming chamber 20. Accordingly, a sealing system is utilized in the present invention, including a sealing ring 56 which is retained in position adjacent to the rotatable hollow shaft 50 by a retainer ring 58. The sealing ring 56 forms a hollowed-out groove 60 which surrounds a closed path portion of the hollow shaft 50. In order to prevent egress of cooling fluid and ingress of hostile chamber atmosphere along the outer surface of the rotatable shaft 50, the groove 60 is purged with a pressurized fluid flow. Preferably, a gaseous sealing medium is supplied to the groove 60 through inlet tubes 61 at a pressure in excess of the pressure of both the cooling fluid and the hostile gaseous atmosphere, e.g., 90 lbs/in.$^2$, thus setting up a gaseous curtain which prevents communication therebetween. A gaseous sealing medium is selected which is compatible with both the chamber atmosphere and the interior of the engaging device 38, e.g., nitrogen gas. As shown in FIG. 6, conventional sealing rings 62 may be secured to the wall 53 by a retainer 63 to serve as a secondary sealing system.

With continued reference to FIG. 6, the engaging member 46 may be rotatably driven by a sprocket and chain assembly 64 secured to the interior end of hollow shaft 50 within elongated arm 42. A source of driving force 65, e.g., an electric motor, may be conveniently mounted on the support facility 40 to drive the sprocket and chain assembly 64. Alternatively, a reciprocating arm linkage may be disposed within the elongated arm 42 to drive the engaging member 46.

The present invention is not intended to be limited by the description of the preferred embodiment disclosed herein. Rather, it is defined by the claims which follow.

We claim:

1. A method of making a continuous ribbon of glass comprising:
   delivering a stream of molten glass onto a pool of molten metal so as to form a ribbon of glass;
   applying lateral forces to the ribbon as it is drawn longitudinally on the molten metal, at least a portion of the forces being applied by means of a rotating cylinder having glass-contacting projections on its outer surface engaging marginal edge portions of the ribbon, the cylinder being rotated about its axis and the axis being supported substantially horizontally, the projections engaging the ribbon at an orientation so as to exert a force on the ribbon substantially free of a longitudinal component.

2. A method of making a continuous ribbon of glass comprising:
   delivering a stream of molten glass onto a pool of molten metal so as to form a ribbon of glass; applying tractive forces to the ribbon as it is drawn longitudinally on the molten metal, at least a portion of the forces being applied by means of a rotating cylinder having glass-contacting projections on its outer surface engaging marginal edge portions of the ribbon, the cylinder being rotated about its axis and the axis being supported substantially horizontally, each projection having its major glass-impelling surface extending substantially radially outward from the cylinder and extending substantially parallel to the axis of the cylinder so that the glass-impelling surfaces are substantially normal to the direction followed by the projections as they move in contact with the glass.

3. The method of making a continuous ribbon of glass comprising:
   delivering a stream of molten glass onto a pool of molten metal so as to form a ribbon of glass;
   applying transverse forces to the ribbon as it is drawn longitudinally on the molten metal, at least a portion of the forces being applied by means of a unitary rotating cylinder having glass-contacting projections on its outer surface engaging marginal edge portions of the ribbon, the cylinder being rotated about its axis and the axis being supported substantially horizontally, continuously engaging the ribbon with a plurality of the projections no less than four centimeters apart in the direction of the axis of the cylinder.

4. The method of claim 1, 2 or 3 wherein the transverse forces are applied to the glass ribbon in a zone where the ribbon is at a temperature below 1500° F. (815° C.).

5. The method of claims 1, 2 or 3 wherein the cylinder is supported with its downstream end angled toward the center of the ribbon, with an angle less than 45° between the axis of the cylinder and the direction of glass travel.

6. The method of claim 1 or 2 wherein a plurality of the projections are in contact with the glass during substantially the entire rotation of the cylinder.

7. The method of claim 6 wherein at least 3 projections are in contact with the glass during substantially the entire rotation of the cylinder.

8. The method of claim 6 wherein at least 5 projections are in contact with the glass during substantially the entire rotation of the cylinder.

9. The method of claim 3 wherein at least 3 projections are in contact with the glass during substantially the entire rotation of the cylinder.

10. The method of claim 3 wherein at least 5 projections are in contact with the glass during substantially the entire rotation of the cylinder.

11. The method of claim 6 wherein contacts between the projections and the glass are at least four centimeters apart along the axial length of the cylinder.

12. The method of claim 1 or 3 wherein each projection has a glass-impelling surface that extends substantially radially outward from the cylinder and extends substantially parallel to the axis of the cylinder, whereby the glass-impelling surfaces are substantially normal to the direction followed by the projection as they move in contact with the glass.

13. The method of claim 12 wherein at least some of the glass-impelling surfaces are angled slightly longitudinally with respect to the axis, at an angle no greater than 45°.

14. The method of claim 1, 2 or 3 wherein the projections comprise discrete teeth.

15. The method of claim 1, 2 or 3 wherein the projections comprise substantially continuous helical ridges.

16. The method of claim 15 wherein the axis of the cylinder is supported substantially parallel to the longitudinal direction of glass travel as it is being rotated.

17. The method of claim 2 or 3 wherein contact between the projections and the glass ribbon impart to the ribbon forces having a major lateral component and a minor longitudinal component.

18. The method of claim 1, 2 or 3 wherein the lateral forces are applied outwardly with respect to the centerline of the glass ribbon, and the ribbon is attenuated to a thickness less than the equilibrium thickness.

19. The method of claim 18 wherein the ribbon is attenuated to a thickness less than the equilibrium thickness prior to being engaged by the cylinder.

20. Apparatus for attenuating a ribbon of glass which moves horizontally through an elongated chamber upon a pool of molten metal, comprising:
   a generally cylindrical member;
   means for supporting the cylindrical member within the chamber with its axis substantially parallel to the longitudinal direction of glass travel;
   means for rotating the cylindrical member about its axis;
   a plurality of glass-engaging elements projecting from the surface of the cylindrical member, each glass-engaging element having its major glass-impelling surface oriented substantially radially with respect to the cylinder and substantially parallel to the axis of the cylinder.

21. Apparatus for attenuating a ribbon of glass which moves horizontally through an elongated chamber upon a pool of molten metal, comprising:
- a generally cylindrical member;
- means for supporting the cylindrical member within the chamber with its axis substantially parallel to the longitudinal direction of glass travel;
- means for rotating the cylindrical member about its axis;
- a plurality of glass-engaging elements projecting from the surface of the cylindrical member in an array distributed both circumferentially and axially on the cylinder, with no less than four centimeters in the axial direction between adjacent projections.

22. Apparatus for attenuating a ribbon of glass which moves downstream through a chamber upon a pool of molten metal, comprising:
- a generally cylindrical member;
- means for supporting the cylindrical member within the chamber with its axis substantially parallel to downstream direction of glass travel;
- means for rotating the cylindrical member about its axis;
- a plurality of glass-engaging ridges projecting from the surface of the cylindrical member and extending helically around the cylinder at a pitch angle less than 45° with respect to the axis.

23. The apparatus of claims 20, 21, or 22 wherein the axis of the cylinder is supported at an angle between 0° and 45° with respect to the direction of glass travel.

24. The apparatus of claim 20 or 21 wherein the projections are arrayed on the cylinder so that any plane tangential to the cylinder intersects at least three of the projections spaced apart axially.

25. The apparatus of claim 24 wherein the tangential plane intersects at least 5 of the projections spaced apart axially.

* * * * *